US012633212B2

(12) United States Patent
Karimian

(10) Patent No.: US 12,633,212 B2
(45) Date of Patent: May 19, 2026

(54) METHOD AND SYSTEM FOR PROVIDING BLIND SPOT WARNING TO VEHICLES

(71) Applicant: Behrooz Karimian, Toronto (CA)

(72) Inventor: Behrooz Karimian, Toronto (CA)

( * ) Notice: Subject to any disclaimer, the term of this patent is extended or adjusted under 35 U.S.C. 154(b) by 0 days.

(21) Appl. No.: 18/676,921

(22) Filed: May 29, 2024

(65) Prior Publication Data

US 2024/0321090 A1      Sep. 26, 2024

(51) Int. Cl.
| | |
|---|---|
| *G08G 1/095* | (2006.01) |
| *G01S 13/931* | (2020.01) |
| *G01S 17/931* | (2020.01) |
| *G08G 1/16* | (2006.01) |

(52) U.S. Cl.
CPC ............ *G08G 1/095* (2013.01); *G01S 13/931* (2013.01); *G01S 17/931* (2020.01); *G08G 1/164* (2013.01); *G01S 2013/9315* (2020.01)

(58) Field of Classification Search
CPC ...... G08G 1/095; G08G 1/164; G01S 13/931; G01S 17/931; G01S 2013/9315
See application file for complete search history.

(56) References Cited

U.S. PATENT DOCUMENTS

| | | | | |
|---|---|---|---|---|
| 7,190,283 | B1 * | 3/2007 | Varian | G08G 1/164 |
| | | | | 340/436 |
| 10,872,530 | B2 * | 12/2020 | Budde | G08G 1/166 |

| | | | | |
|---|---|---|---|---|
| 2020/0072965 | A1 * | 3/2020 | Cao | G05D 1/024 |
| 2023/0417912 | A1 * | 12/2023 | Xu | G01S 17/66 |

FOREIGN PATENT DOCUMENTS

| | | | | | |
|---|---|---|---|---|---|
| AU | 2017216548 | A1 * | 9/2017 | | G08G 1/144 |
| CN | 219676717 | U * | 9/2023 | | |
| DE | 202019005763 | U1 * | 11/2021 | | E01F 9/608 |
| JP | 7286155 | B2 * | 6/2023 | | |
| KR | 100919382 | B1 * | 9/2009 | | G08G 1/09 |
| WO | WO-2015001677 | A1 * | 1/2015 | | G08G 1/166 |

* cited by examiner

*Primary Examiner* — Curtis A Kuntz
*Assistant Examiner* — James E Munion

(57)      ABSTRACT

The present invention relates to a blind spot alert system designed for alerting vehicles approaching from multiple directions. The system includes a housing mounted at a strategic location, equipped with a comprehensive sensor sub-system. This sub-system includes Passive Infrared (PIR) sensors to detect thermal radiation of animate entities, Light Detection and Ranging (LIDAR) sensors to measure vectored distances of surrounding objects, Ultrasonic sensors for non-vectored distance measurement, and Doppler speed measurement sensors to capture vehicle velocity and trajectory. A microcontroller processes the data from these sensors, analyses it to detect potential threats, and generates appropriate warning signals. These warning signals are transmitted to an indicator sub-system that provides visual or audible alerts to the approaching vehicles. Additionally, the system includes a server that receives and stores the analyzed data for further processing or record-keeping.

19 Claims, 6 Drawing Sheets

400

Calibrate sensors reading without traffic — 402

Configuring mode change of the microcontroller — 404

Initialize the visual indicators to a default safe state — 406

Load pre-configured power settings for the sensors — 408

Verify connectivity of blind spot alert system with server — 410

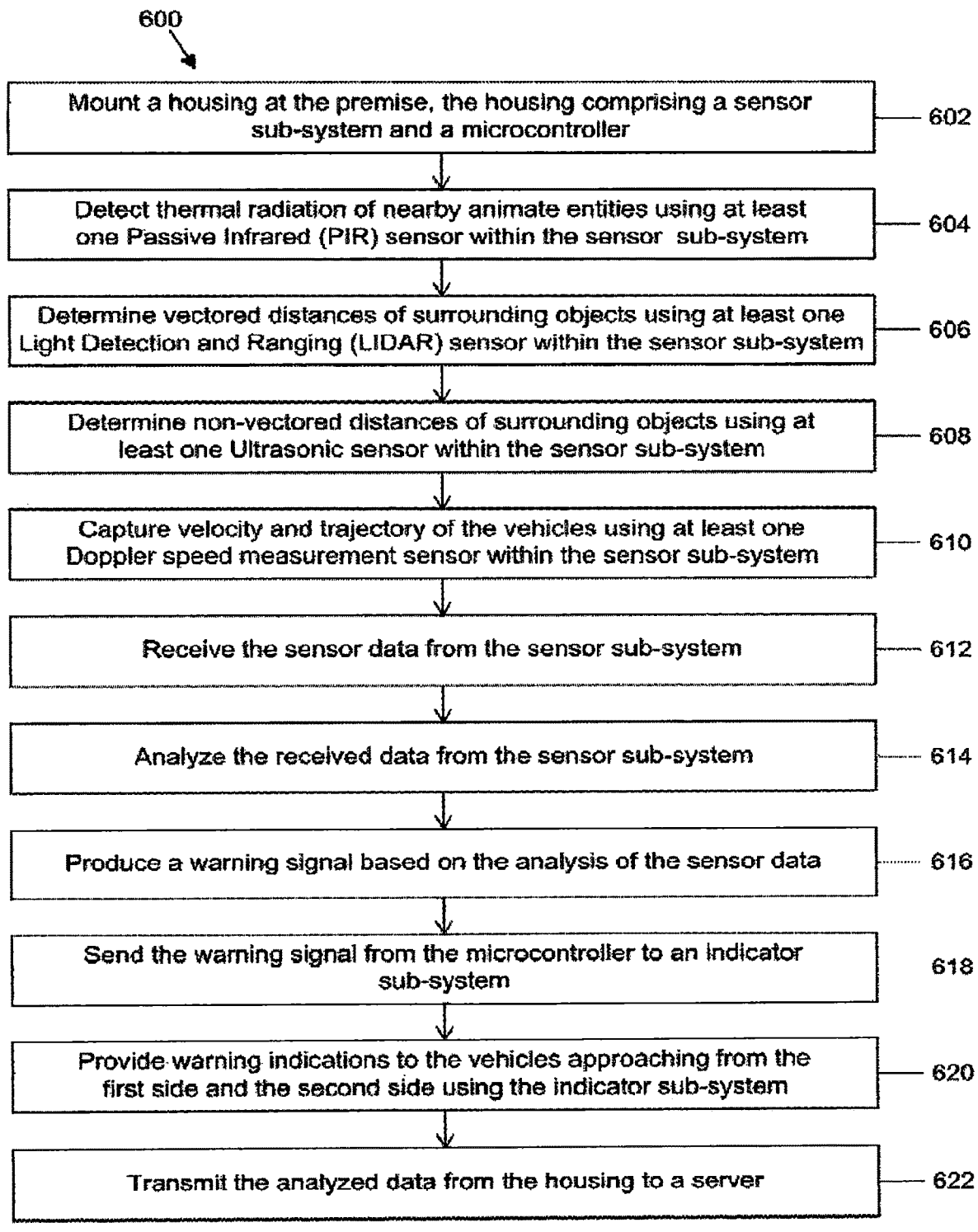

600

Mount a housing at the premise, the housing comprising a sensor sub-system and a microcontroller — 602

Detect thermal radiation of nearby animate entities using at least one Passive Infrared (PIR) sensor within the sensor sub-system — 604

Determine vectored distances of surrounding objects using at least one Light Detection and Ranging (LIDAR) sensor within the sensor sub-system — 606

Determine non-vectored distances of surrounding objects using at least one Ultrasonic sensor within the sensor sub-system — 608

Capture velocity and trajectory of the vehicles using at least one Doppler speed measurement sensor within the sensor sub-system — 610

Receive the sensor data from the sensor sub-system — 612

Analyze the received data from the sensor sub-system — 614

Produce a warning signal based on the analysis of the sensor data — 616

Send the warning signal from the microcontroller to an indicator sub-system — 618

Provide warning indications to the vehicles approaching from the first side and the second side using the indicator sub-system — 620

Transmit the analyzed data from the housing to a server — 622

FIG. 6

METHOD AND SYSTEM FOR PROVIDING BLIND SPOT WARNING TO VEHICLES

TECHNICAL FIELD

The present invention relates generally to vehicle collision avoidance systems, and more particularly, to a blind spot alert system designed for premises such as intersections, driveways, and parking areas.

BACKGROUND

Vehicle collisions, particularly those occurring in blind spots, are a significant concern in traffic safety. Blind spots are areas around a vehicle that are not visible to the driver, either through the mirrors or by direct line of sight. These zones pose a high risk as vehicles or pedestrians within them can go unnoticed, leading to potential accidents. Traditional blind spot detection systems have primarily been integrated into vehicles, focusing on providing drivers with alerts about nearby cars. However, these systems do not address blind spot hazards that occur at specific premises such as intersections, driveways, parking lots, or other areas with complex traffic patterns.

Intersections and driveways, in particular, present unique challenges. Vehicles approaching from multiple directions can be hidden from view by obstacles such as buildings, foliage, or other parked vehicles. In parking areas, low-speed maneuvers often result in collisions due to limited visibility and the presence of pedestrians and other vehicles.

Existing solutions for these environments include static mirrors or convex mirrors placed at strategic points, but these are often insufficient. They require drivers to actively look for potential hazards, which may be missed due to distraction or poor visibility conditions. Additionally, mirrors do not provide active alerts and cannot differentiate between moving objects and stationary ones, nor can they measure the speed and trajectory of approaching vehicles.

U.S. Pat. No. 6,198,409 by Schofield et al. discloses a vehicle rear view display system that displays indications from a blind spot detector. The system includes a first indicator assembly positioned on the vehicle near an exterior mirror, which produces an indication of the presence of an object adjacent to the corresponding side of the vehicle. A second indicator assembly is provided on the vehicle's interior mirror assembly, which also produces an indication of the presence of an object adjacent to the same side of the vehicle. This setup provides redundant indications at both the interior and exterior mirrors to assist the driver in evaluating conditions around the vehicle before making a maneuver. However, this redundancy can lead to information overload and distraction for the driver.

U.S. Pat. No. 6,727,808 by Uselmann et al. discloses a sonic blind spot monitoring system designed to alert a driver when a vehicle is positioned in a blind spot. This system comprises a vehicle equipped with a sonar device that emits sonar waves into the area adjacent to the vehicle corresponding to the driver's blind spot. The sonar device includes a receptor that receives reflections of the sonar waves, enabling the detection of objects in the blind spot. A display device, positioned within the vehicle and visible to the driver, is operationally coupled to the sonar device. This display provides a visual signal when an object is detected in the blind spot by the sonar system. However, this setup may create a distraction for the driver while driving, moreover relying solely on sonar sensor readings may not be sufficient to detect blind spots accurately.

In response to these evolving trends and challenges, there is an increasing demand for a sophisticated blind spot alert system specifically designed for installation at various premises. Such a system would utilize a combination of advanced sensors to continuously monitor and analyze the environment. By providing timely warnings to drivers about potential hazards, it aims to enhance safety at intersections, driveways, and parking areas.

Although various methods and systems for providing blind spot warning to vehicles have been proposed in the past, they have their own shortcomings or limitations, thus there still exists a need for a system and method for providing comprehensive and reliable blind spot detection and warning that minimizes driver distraction, improves detection accuracy through the integration of multiple sensor technologies, and effectively alerts drivers without causing information overload.

SUMMARY

It will be understood that this disclosure is not limited to the particular systems, and methodologies described, as there can be multiple possible embodiments of the present disclosure which are not expressly illustrated in the present disclosure. It is also to be understood that the terminology used in the description is for the purpose of describing the particular versions or embodiments only and is not intended to limit the scope of the present disclosure.

In an embodiment, the present invention provides a blind spot alert system designed to enhance safety at premises by alerting vehicles approaching from multiple directions. The system comprises a housing mounted at a strategic location, equipped with a comprehensive sensor sub-system. The sensor sub-system includes Passive Infrared (PIR) sensors to detect thermal radiation of animate entities, Light Detection and Ranging (LIDAR) sensors to measure vectored distances of surrounding objects, Ultrasonic sensors for non-vectored distance measurement, and Doppler speed measurement sensors to capture vehicle velocity and trajectory. A microcontroller processes the data from these sensors, analyses the data to detect potential threats, and generate appropriate warning signals. These warning signals are transmitted to an indicator sub-system that provides visual or audible alerts to the approaching vehicles. Additionally, the system includes a server that receives and stores the analysed data for further processing or record-keeping.

In an embodiment, the housing further includes a hybrid power management sub-system, wherein the hybrid power management sub-system includes at least two of a Direct Current (DC) power supply, a Lithium-ion battery power supply, a Solar power supply.

In an embodiment, the housing further includes at least one camera for capturing images of at least one of a vehicle coming from the first side or the second side. Further, the housing is weatherproof and designed to operate under various environmental conditions.

In an embodiment, data from the sensors is collected based on one or more parameters, wherein one or more parameters comprises at least one of arrangement of the housing at the location, lighting condition of the surrounding environment of the housing, humidity condition of the location, and sensitivity set for the location.

In an embodiment, the Ultrasonic sensor is calibrated to detect objects within a predetermined range to minimize false alarms, and the Doppler speed measurement sensor is configured to distinguish between vehicles and other moving objects based on velocity profiles.

In an embodiment, the blind spot alert system further includes an Artificial Intelligence sub-system within the microcontroller to improve the accuracy of warning signals over time based on historical data. Further, the microcontroller is configured to filter out noise and irrelevant data from the sensor sub-system to enhance the precision of the warning signals. Furthermore, the microcontroller includes a communication module to interface with external devices or networks wirelessly. Additionally, the microcontroller is configured to prioritize warning signals based on predefined rules.

In an embodiment, the warning indication provided by the indicator sub-system includes visual signals. In another embodiment, the warning indication provided by the indicator sub-system includes auditory signals.

In an embodiment, the server is configured to send real-time alerts to a connected network or monitoring system for further action. Further, the server includes a diagnostic sub-system to manage sensor sub-system malfunctions.

These and other features and advantages of the present invention will become apparent from the detailed description below, in light of the accompanying drawings.

BRIEF DESCRIPTION OF THE DRAWINGS

FIG. 6 illustrates a flow diagram of a method for providing blind spot warning to vehicles at a premise, according to an embodiment of the present invention.

DETAILED DESCRIPTION

Figure 1:
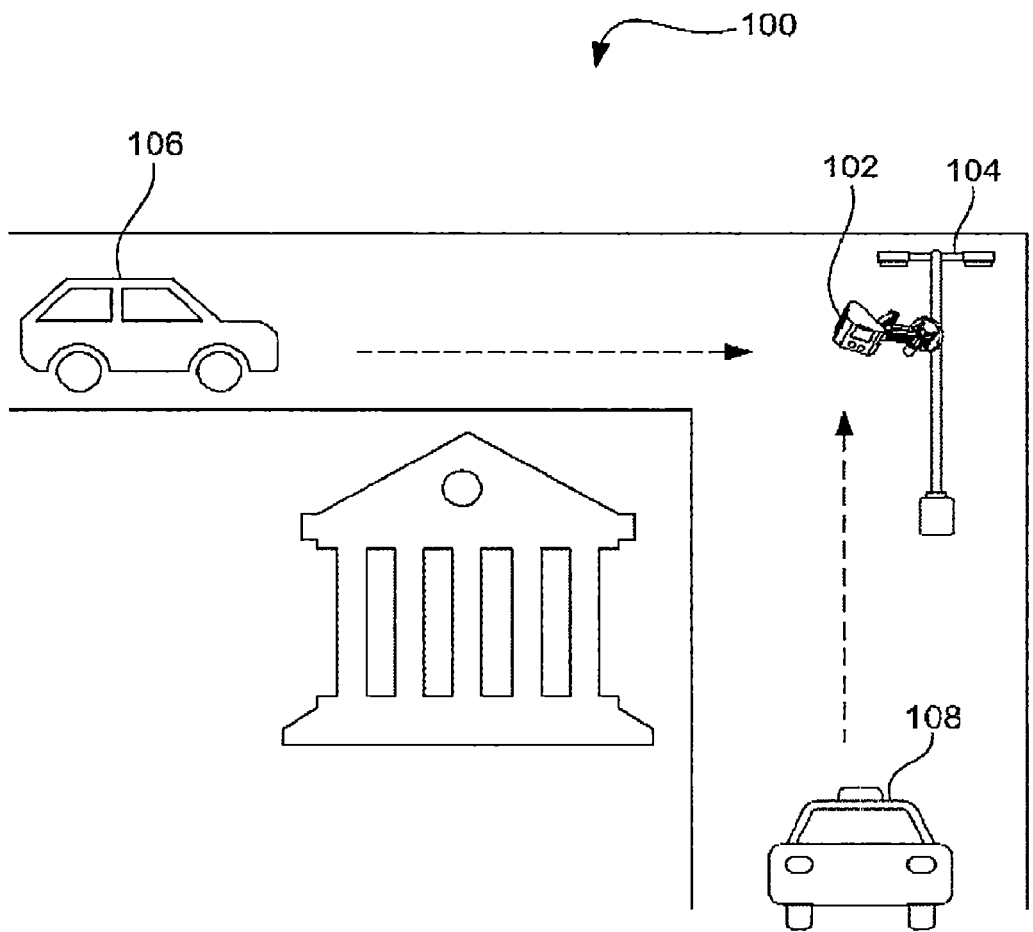
FIG. 1 illustrates a general implementation of a blind spot alert system, according to an exemplary embodiment of the present invention.

As used in the specification, the singular forms "a", "an" and "the" may also include plural references. For example, the term "an article" may include a plurality of articles. Those with ordinary skill in the art will appreciate that the elements in the figures are illustrated for simplicity and clarity and are not necessarily drawn to scale. There may be additional components or processes described in the foregoing application that are not depicted on the described drawings. In the event, such a component or process is described, but not depicted in a drawing, the absence of such component and process from the drawings should not be considered as an omission of such design from the specification.

Before describing the present invention in detail, it should be observed that the present invention utilizes a combination of components or processes, which constitutes a blind spot alert system. Accordingly, the components or processes have been represented, showing only specific details that are pertinent for an understanding of the present invention so as not to obscure the disclosure with details that will be readily apparent to those with ordinary skill in the art having the benefit of the description herein. As required, detailed embodiments of the present invention are disclosed herein; however, it is to be understood that the disclosed embodiments are merely exemplary of the invention, which can be embodied in various forms. Therefore, specific component-level details and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

References to "one embodiment", "an embodiment", "another embodiment", "one example", "an example", "another example", "yet another example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment. The words "comprising", "having", "containing", and "including", and other forms thereof, are intended to be equivalent in meaning and be open-ended in that an item or items following any one of these words is not meant to be an exhaustive listing of such item or items or meant to be limited to only the listed item or items. Further, the word "user" and "person" are used interchangeably in the description.

A blind spot alert system will now be described with reference to the accompanying drawings, particularly FIGS. 1-6.

Referring to FIG. 1 in conjunction with FIGS. 2-6, illustrates a blind spot alert system 100, in accordance with various exemplary embodiments of the present invention. As can be seen in FIG. 1, the blind spot alert system 100 includes a housing 102 mounted at a premise. A side view of the housing 102 along with a mounting structure is described in conjunction with FIG. 2. The housing 102 refers to a physical enclosure or structure that contains one or more components of the blind spot alert system 100. The housing 102 is designed to protect and house a sensor sub-system, a microcontroller, and any other necessary electronics. In an embodiment, the housing 102 is weatherproof and designed to operate under various environmental conditions. Different sub-systems of the housing 102 are described in conjunction with FIG. 3. Further, premise refers to a specific location, such as a building, parking lot, driveway, intersection, or any area where blind spot avoidance for vehicles is required. The premise could be any place that requires enhanced safety measures to alert drivers about potential blind spot hazards.

Furthermore, the housing 102 is configured at a location in the premise to signal vehicles (i.e., first vehicle 106 and second vehicle 108) coming from a first side and a second side. This indicates that the housing 102 is strategically positioned so that it can effectively monitor and signal vehicles approaching from two different directions (referred to as the first side and the second side). Examples of vehicles include at least one of cars, vans, buses, trucks, motorcycles, emergency vehicles, and bicycles. In an example, the housing 102 can be strategically positioned so that it can effectively monitor and signal vehicles approaching from more than two different directions such as T-junctions and four-way junctions. At a T-junction, the housing 102 can be placed at the center of the intersection where the three roads meet. This allows it to monitor traffic coming from the left, right, and the road directly opposite the junction. By doing so, it can signal drivers on all three approaches about the presence of vehicles and pedestrians, ensuring safe crossing and preventing potential collisions. In a four-way junction, the housing 102 can be installed at the center or at strategic points on each corner. This setup enables it to monitor and signal vehicles from all four directions. For instance, if vehicles are approaching from the north, south, east, and west, the housing can detect each vehicle's movement and appropriately signal them.

In one example, at a busy intersection with obstructed views, the housing 102 could be mounted on a pole 104 or over or underside of the already installed convex mirror, or at the corner of a building. It would be positioned to monitor traffic coming from both the left and right sides. When the vehicles approach from either direction and blind spot based collision is determined, the system within housing 102 activates warning signals, such as flashing lights or audible alerts, to notify drivers of the approaching traffic. In another example, at the exit of a parking lot, the housing 102 could be installed on a post at the end of the driveway. It would be configured to detect vehicles coming from the left and right on the adjacent road. When an approaching vehicle is detected and blind spot based collision is determined, the system triggers a warning signal, such as a flashing light, to alert drivers exiting the parking lot about the oncoming traffic. Determination of the blind spot based collision is described in conjunction with FIG. 3.

In another example, at a T-junction, the housing 102 can be strategically positioned at the center where the three roads intersect. This configuration allows the housing 102 to monitor and signal traffic from the left, right, and the road directly opposite the junction. The housing 102 can be designed with three sides to cover all these directions. Alternatively, a combination of two or more housings can be used to collectively monitor and signal vehicles from all directions.

Figure 2:
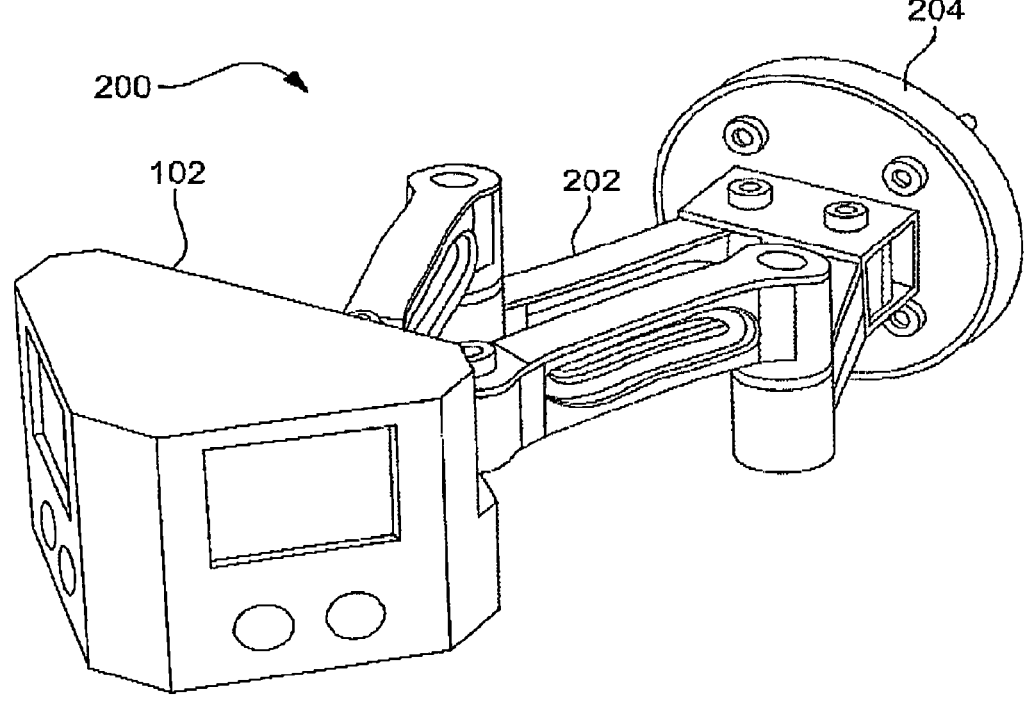
FIG. 2 illustrates a side view of a housing that can be configured at a location to signal vehicles coming from a first side and a second side, according to an exemplary embodiment of the present invention.

FIG. 2 illustrates side view 200 of the housing 102 that can be configured at a location to signal vehicles 106 and 108 coming from the first side (e.g., left side) and the second side (e.g., right side), according to an exemplary embodiment of the present invention. The housing 102 is designed to be robust and weather-resistant, suitable for indoor or outdoor installation. The housing 102 protects the internal components from environmental factors such as rain, dust, and extreme temperatures. In an embodiment, the design of the housing 102 may include mounting brackets 202 or fixtures 204 or both the brackets 202 and fixtures 204 to secure the housing 102 at the desired location on the premise.

In an example, the brackets 202 are wall-mounted brackets. These are designed to mount the housing directly onto a vertical surface, such as the side of a building or a wall at an intersection. They provide a stable and permanent installation. In another example, the brackets 202 are adjustable brackets. These allow for fine-tuning the orientation of the housing 102. They can be adjusted to point one or more sensors of the sensor sub-system in the optimal direction to cover desired detection zones. In yet another example, the brackets 202 are corner brackets. These are designed for mounting the housing 102 on the corner of a building or structure, these brackets allow the sensors to cover two adjacent sides, making them ideal for intersections or corner exits.

In an example, the fixtures 204 are clamp-on fixtures. These are designed to attach the housing to existing poles, such as traffic light poles or street signs. The clamp mechanism ensures a secure fit and can be adjusted for height and angle. In another example, the fixtures 204 are custom pole fixtures. These fixtures are specifically manufactured to fit certain types of poles, ensuring a perfect fit and stability. They often include features to prevent rotation or slippage.

In an embodiment, the design of the housing 102 may include ground-mounted supports such as pedestal mounts, and flexible stands. Pedestal mounts are sturdy bases that can be bolted into the ground, providing a stable platform for the housing 102. This is useful in open areas where wall or pole mounting is not feasible. Flexible stands allow for the housing 102 to be placed on uneven terrain. They include adjustable legs to ensure the housing 102 remains level and correctly oriented.

The brackets 202 and fixtures 204 are typically made from robust materials such as stainless steel, aluminium, or high-grade plastic to ensure longevity and resistance to corrosion and weathering. To withstand various environmental conditions, these components often feature protective coatings or treatments that prevent rust and degradation. Adjustable brackets and fixtures provide flexibility in positioning the housing, allowing it to be tailored to the specific needs of different locations.

Figure 3:
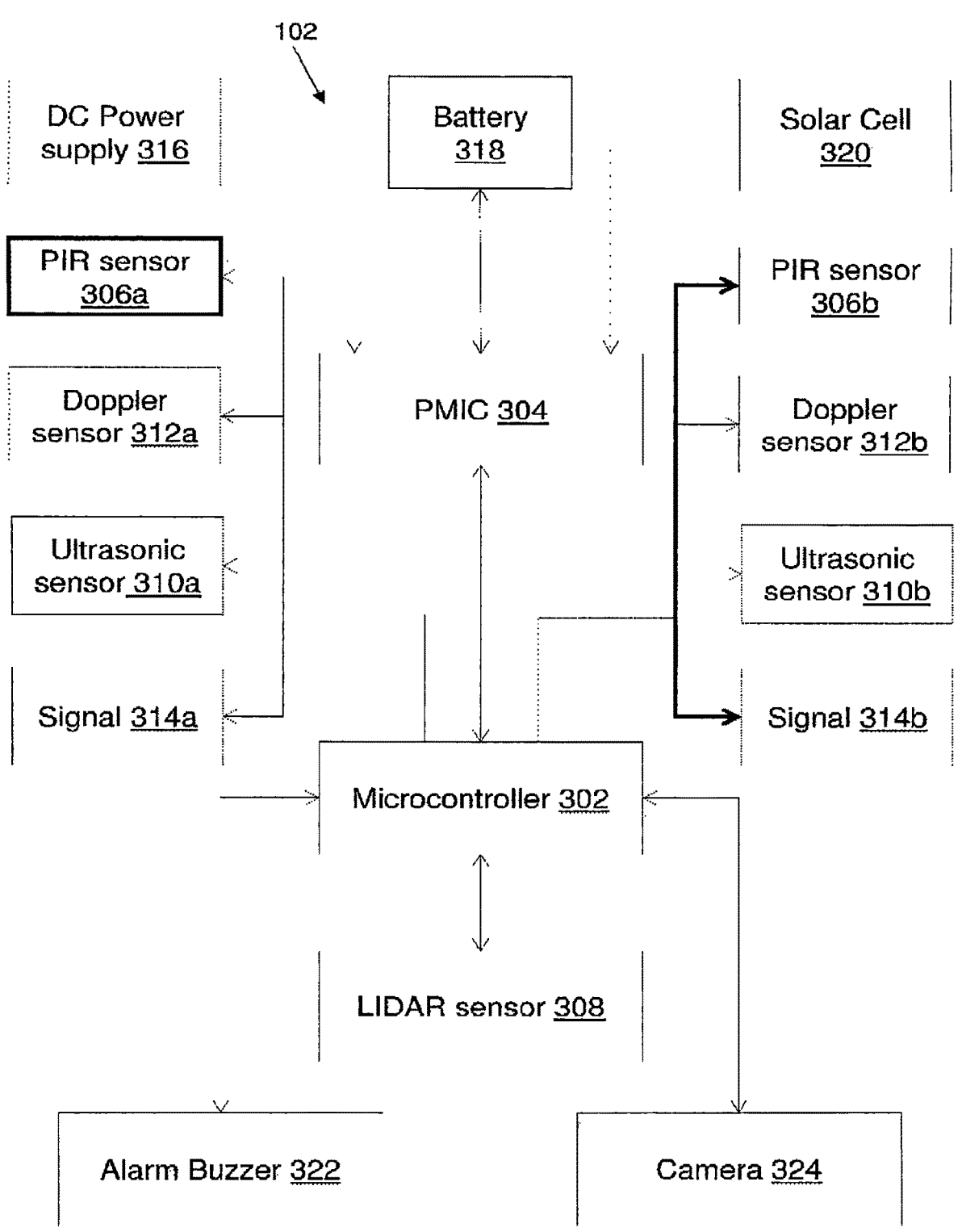
FIG. 3 illustrates a schematic diagram of various sub-systems of the housing, according to an embodiment of the present invention.

FIG. 3 illustrates a schematic diagram of various sub-systems of the housing 102, according to an embodiment of the present invention. In an embodiment, the housing 102 includes the sensor sub-system, a microcontroller 302, and a hybrid power management sub-system. As shown in FIG. 3, the sensor sub-system includes at least one Passive Infrared (PIR) sensor, for example, PIR sensor 306a and PIR sensor 306b. Further, the sensor sub-system includes at least one Light Detection and Ranging (LIDAR) sensor, for example, LIDAR sensor 308. Further, the sensor sub-system includes at least one Ultrasonic sensor, for example, Ultrasonic sensor 310a and Ultrasonic sensor 310b. Further, the sensor sub-system includes at least one Doppler speed measurement sensor, for example, Doppler sensor 312a and Doppler sensor 312b.

In an embodiment, the PIR sensors 306a and 306b are configured to detect thermal radiation of nearby animate entities such as pedestrians or animals. Each PIR sensor is configured to monitor a specific coverage area. By using multiple sensors (PIR sensor 306a and 306b), the system can cover a broader area and detect movement from different directions, enhancing the overall detection capability. For example, each PIR sensor consists of a pyroelectric material that generates an electric charge when exposed to infrared radiation. The PIR sensor has two slots that detect infrared radiation, creating a differential signal (hereinafter referred to as PIR sensor data) when a warm object, for example, such as a pedestrian or an animal moves across the field of view of the PIR sensor. The PIR sensor data from the PIR sensors 306a and 306b are sent to the microcontroller 302 for processing.

In an embodiment, the LIDAR sensor 308 is configured to determine the vectored distance of surrounding objects. Generally, LIDAR technology uses laser pulses to measure distances to surrounding objects. The LIDAR sensor 308 emits laser beams that bounce off objects and return to the LIDAR sensor 308. By calculating the time, it takes for the laser pulses to return (hereinafter referred to as Time of Flight), the LIDAR sensor 308 determines the distance to each object. Examples of an object include at least one of a vehicle, a pedestrian, an animal, any fixed structures, debris, and temporary obstacles. Further, the LIDAR sensor 308 provides information about the direction (vector) from which the laser pulses were reflected. This allows the blind spot alert system to map the spatial position of objects in three dimensions. The LIDAR sensor 308 typically has a wide field of view, allowing it to scan a broad area around the housing 102. The LIDAR sensor 308 can be configured to rotate or oscillate to cover up to 360-degree areas, depending on the system's design requirements.

In an example, the distance to the objects is calculated using the formula:

$$Distance = (Speed\ of\ Light \times Time\ of\ Flight)/2$$

The division by two accounts for the round trip of the laser pulse (out and back). Along with the distance, the LIDAR sensor 308 records the angle or direction from which each pulse returns. This directional information allows the system to construct a detailed map of the surroundings. In an example, the LIDAR sensor 308 generates a "point cloud," which is a collection of data points representing the positions of objects in the sensor's field of view. Each point in the cloud has x, y, and z coordinates. The data from the LIDAR sensor 308 is sent to the microcontroller 302 for further processing.

In an embodiment, the Ultrasonic sensors 310*a* and 310*b* are configured to determine the non-vectored distance of the surrounding objects. For example, non-vectored distance refers to the measurement of the distance to the object without providing directional information about where the object is located relative to the Ultrasonic sensor 310*a* or Ultrasonic sensor 310*b*. Essentially, non-vectored distance only gives the scalar distance (how far the object is) and not the direction (where the object is). Ultrasonic sensors use sound waves at frequencies higher than the audible range for humans. These sound waves, typically around 40 kHz, are emitted by the Ultrasonic sensors 310*a* and 310*b* and reflect off objects in the environment. Further, the Ultrasonic sensors 310*a* and 310*b* measure the time it takes for the sound waves to travel to an object and back to the Ultrasonic sensors 310*a* and 310*b*. This time-of-flight measurement is used to calculate the distance to the object. The primary purpose of determining non-vectored distance is to detect the presence and proximity of objects within a certain range, which is crucial for short-range detection and avoiding collisions.

In an example, the Ultrasonic sensor 310*a* or Ultrasonic sensor 310*b* calculates the time between sending the sound wave and receiving an echo (i.e., reflected sound waves back to the Ultrasonic sensor 310*a* or Ultrasonic sensor 310*b*). This time is then used to compute the distance to the object using the formula:

$$Distance = (Speed\ of\ sound \times Time\ of\ Flight)/2$$

The division by two accounts for the sound wave traveling to the object and back. The calculated distance is a scalar value indicating how far the object is from the sensor. This value does not include information about the object's direction. This distance data from the Ultrasonic sensors 310*a* and 310*b* is sent to the microcontroller 302. The microcontroller 302 uses this data to determine the proximity of objects and assess potential collision risks. In an embodiment, the Ultrasonic sensor 310*a* or 310*b* is calibrated to detect objects within a predetermined range to minimize false alarms.

In an embodiment, the Doppler speed measurement sensors (i.e., Doppler sensors) 312*a* and 312*b* are configured to capture velocity and trajectory of the vehicles 106 and 108. The Doppler sensors 312*a* and 312*b* operate based on the Doppler effect, which is the change in frequency or wavelength of a wave in relation to an observer moving relative to the wave source. In this context, the Doppler sensors 312*a* and 312*b* emit electromagnetic waves (such as radar) that reflect off moving vehicles 106 and 108. The frequency shift of the reflected waves is used to determine the vehicle's speed and trajectory. By analyzing the frequency shift (Doppler shift) between the emitted and reflected waves, the Doppler sensors 312*a* and 312*b* calculate the speed (velocity) of the moving vehicles 106 and 108. In addition to speed, the Doppler sensors 312*a* and 312*b* can help infer the trajectory or path of the moving vehicles by combining speed data with directional information.

In an example, the Doppler sensor 312*a* or 312*b* calculates the Doppler shift, which is the difference between the emitted wave frequency and the reflected wave frequency. The magnitude of this shift directly correlates with the speed of the vehicle 106 or 108. Using the Doppler formula, the Doppler sensor 312*a* or 312*b* converts the frequency shift into a velocity measurement. While the Doppler shift gives the speed, the Doppler sensor 312*a* or 312*b* can also determine the direction of movement based on the orientation of the Doppler sensor 312*a* or 312*b* and the pattern of the frequency shifts over time. The velocity and trajectory data from the Doppler sensors 312*a* and 312*b* are sent to the microcontroller 302 for processing. By analysing changes in the speed and direction over time, the microcontroller 302 can infer the trajectory or path of the vehicle 106 or 108, predicting its future position and movement pattern. In an embodiment, the Doppler sensor 312*a* or 312*b* is configured to distinguish between vehicles and other moving objects based on velocity profiles. In an example, the velocity profiles refer to characteristic speed ranges and patterns that different types of moving objects typically exhibit. For instance, vehicles generally move at higher speeds compared to pedestrians or animals.

In an embodiment, the microcontroller 302 is configured to receive sensor data from all four types of sensors continuously. The sensor data includes the PIR sensor data, the LIDAR sensor data, the Ultrasonic sensor data, and the Doppler sensor data. The sequence and combination of these sensor data readings provide a comprehensive understanding of the location and its surrounding environment. The accuracy and interpretation of the sensor data can be influenced by setup (sensor positioning), lighting conditions of the surrounding environment, humidity condition of the location, and user-requested sensitivity settings.

Further, the microcontroller 302 is configured to analyze the received sensor data. In an embodiment, the microcontroller 302 uses an Artificial Intelligence sub-system within the microcontroller to improve the accuracy of warning signals over time based on historical data. An AI sub-system within the microcontroller may be a software component designed to enhance the performance and accuracy of the blind spot alert system. It uses machine learning algorithms to analyze data, learn from patterns, and make informed decisions. The AI sub-system records and analyzes historical data from the sensors to improve its predictive capabilities and accuracy of warnings. The AI sub-system uses machine learning models to analyze the possibility of collision. The AI sub-system learns to recognize patterns in the sensor data that correlate with specific types of events or outcomes. Using trained models, the AI sub-system can predict the likelihood of future events based on current sensor readings. The AI enhances the system's ability to differentiate between true positives (actual hazards) and false positives (non-hazardous events incorrectly flagged as dangerous).

Initially, the AI sub-system operates based on pre-defined rules and threshold values for the sensor readings. As the AI sub-system operates, it collects and stores vast amounts of sensor data along with the outcomes of the alerts triggered. Historical data is labelled with outcomes, such as whether an alert led to a successful avoidance of a hazard or if it was a false alarm. Machine learning models are trained on this labeled data to understand the correlation between sensor readings and actual hazardous situations. The AI sub-system continuously analyzes real-time sensor data using the trained models to make predictions about potential hazards. The AI sub-system keeps learning from new data. Each time an alert is triggered, the outcome (whether it was accurate or not) is fed back into the AI sub-system to further refine the models.

Further, the microcontroller 302 is configured to produce a warning signal based on the analysis. In an embodiment, the microcontroller 302 is configured to prioritize warning signals based on predefined rules. In an embodiment, the predefined rules may be related to the location where the housing 102 is installed. In an embodiment, it uses a Finite State Machine (FSM) to produce a warning signal. The FSM consists of a finite number of states, transitions between those states, and actions triggered by state changes. The FSM uses sensor data to transition between states such as "No Obstacle," "Caution," and "Stop." These transition states can be configured based on the requirement. Each state corresponds to specific sensor readings or combinations thereof. In an embodiment, the FSM generates Boolean truth table-based output or fuzzy logic output, or a combination of both.

A Boolean truth table lists all possible combinations of input variables and the corresponding output. For example, the table might define conditions under which a warning light should be activated (e.g., "If PIR detects presence AND LIDAR detects an object within 10 meters AND Doppler detects high speed THEN activate caution light"). This output is binary (true/false) based on predefined rules.

Fuzzy logic deals with reasoning that is approximate rather than fixed and exact. It allows for degrees of truth rather than a simple true/false. Fuzzy logic can interpret sensor data that is not binary, considering varying degrees of risk or caution. For instance, the microcontroller 302 might assess "moderate risk" if a vehicle is approaching at a medium speed and "high risk" if approaching quickly, triggering different levels of alerts accordingly.

Consider a scenario where the blind spot alert system 100 is installed at a busy intersection as shown in FIG. 1. The PIR sensors can detect no presence of a pedestrian or an animal. The LIDAR sensor detects vehicles approaching from the left (Vehicle 106) and right (Vehicle 108). Both vehicles are at a distance of 20 meters from the intersection. Further, the Ultrasonic Sensors confirm proximity of vehicles within 20 meters. Furthermore, the Doppler sensors detect vehicle 106 is approaching at a speed of 40 km/h and vehicle 108 is is approaching at a speed of 50 km/h. Based on the sensor readings, the FSM transitions from "No Obstacle" to "Caution" and activate warning signals (i.e., warning indication) to alert both Vehicle 106 and Vehicle 108 of each other's presence. In an embodiment, the warning indication includes visual signals, for example, signal

314*a* and signal 314*b*. In another embodiment, the waring indication includes auditory signals, for example, alarm buzzer 322. If the vehicles continue to approach without slowing down and enter a closer range (e.g., within 10 meters), and Doppler sensors still detect high speeds, then activate stop lights to prevent vehicles from entering the intersection simultaneously, thereby avoiding a collision. This scenario may be represented by a Boolean Truth Table as shown below:

| PIR | LIDAR Distance (m) | Ultrasonic Distance (m) | Doppler Speed (km/h) | Output |
|-----|-----|-----|-----|-----|
| 0 | >20 | >20 | Low | No Action |
| 0 | ≤20 | ≤20 | Medium | Caution Light |
| 0 | ≤10 | ≤10 | High | Stop Light |

Consider the above scenario where fuzzy logic is used instead of FSM. The risk level may be represented as below:
 a) No Risk: No significant readings.
 b) Low Risk: Vehicles detected but at a safe distance and speed.
 c) Moderate Risk: Vehicles within 20 meters, approaching at moderate speed.
 d) High Risk: Vehicles within 10 meters, approaching at high speed.

In an embodiment, the microcontroller 302 is further configured to filter out noise and irrelevant data from the sensor sub-system to enhance the precision of the warning signals. In a real-world environment, sensors can pick up a lot of extraneous information or 'noise.' This can include at least one background thermal radiation, random sound waves, or irrelevant objects, and minor errors or fluctuations in sensor readings. In an example, the microcontroller 302 applies algorithms to filter out random noise from the sensor data. Further, the microcontroller 302 averages out minor fluctuations to provide a stable and consistent signal. Further, the microcontroller 302 sets minimum and maximum limits for sensor readings to ignore irrelevant data. For example, it might ignore thermal readings below a certain temperature threshold to avoid detecting non-animate objects. Furthermore, the microcontroller 302 cross-references data from multiple sensors to confirm the presence of an actual hazard. For example, an object detected by the LIDAR sensor will also need to be confirmed by the Ultrasonic sensor to be considered relevant. Further, the microcontroller 302 checks if the detected object persists over a certain period, filtering out transient noise or momentary false positives.

Additionally, the microcontroller 302 adjusts filtering parameters based on the environment. For instance, in a high-traffic area, it might increase the threshold to avoid excessive warnings. Further, the blind spot alert system allows customization of sensitivity levels based on user preferences or specific locations (e.g., higher sensitivity in school zones). In an embodiment, the microcontroller 302 includes a communication module to interface with external devices or networks wirelessly.

As shown in FIG. 3, the sensor sub-system and the controller 302 received power from the hybrid power management sub-system that includes a Power Management Integrated Circuit (PMIC) 304, a Direct Current (DC) power supply 316, a battery 318, and a solar cell 320. The PMIC 304 is a specialized integrated circuit designed to manage power requirements efficiently. It handles the distribution of power from different sources to ensure that the system components receive a stable and regulated supply. The DC power supply 316 provides power directly from an external DC source, such as the electrical grid or a dedicated power line. It can supply continuous and stable power to the system, especially useful when solar power is insufficient (e.g., during nighttime or cloudy days).

Further, the battery 318 stores electrical energy for use when primary power sources (DC supply or solar cell) are unavailable or insufficient. It ensures that the blind spot alert system 100 remains operational during power outages or periods of low solar energy. It acts as a backup power source, providing autonomy and reliability. Furthermore, the solar cell 320 provides a renewable and eco-friendly power source. During daylight hours, the solar cell 320 generates electricity, which can be used directly or stored in the battery for later use.

Further, the PMIC 304 receives input from the DC power supply 316, the battery 318, and the solar cell 320. It regulates and distributes power to ensure that all components, including the sensor sub-system and the controller 302, receive a stable and appropriate voltage and current. The PMIC 304 prioritizes power sources based on availability and efficiency, switching between solar, DC supply, and battery as needed.

As shown in FIG. 3, the housing 102 further includes a camera 324 configured to detect at least one object in the blind spot of the vehicle 106 or the vehicle 108. In an embodiment, the camera 324 incorporates advanced object and motion detection mechanisms, leveraging a stored background image to monitor for any changes or movements in the surroundings of the housing. When the camera 324 identifies the object entering the blind spot area of the vehicle 106 or the vehicle 108, it triggers a response similar to sensors discussed above for generating a warning alert. For example, the camera 324 is incorporated in the housing to monitor the surroundings of the housing. The microcontroller 302 of the blind spot alert system continuously compares the current live feed from the camera 324 with a baseline background image of the vehicle's surroundings. If a pedestrian, another vehicle, or any object is detected in the car's blind spot (i.e., an area not visible to the driver of the vehicle through standard mirrors) the blind spot alert system recognizes this discrepancy. Immediately, the microprocessor processes the information along with the sensor data and activates the warning signal.

Further, the camera 324 is configured to capture images of at least one of the vehicles 106 or 108 coming from the first side or the second side when one of the vehicles suddenly moves fast after visualizing the warning signal. The camera 324 is configured to record the event and the indicator sub-system is configured to sounds an audible buzzer to alert nearby vehicles of the approaching fast-moving vehicle.

Figure 4:
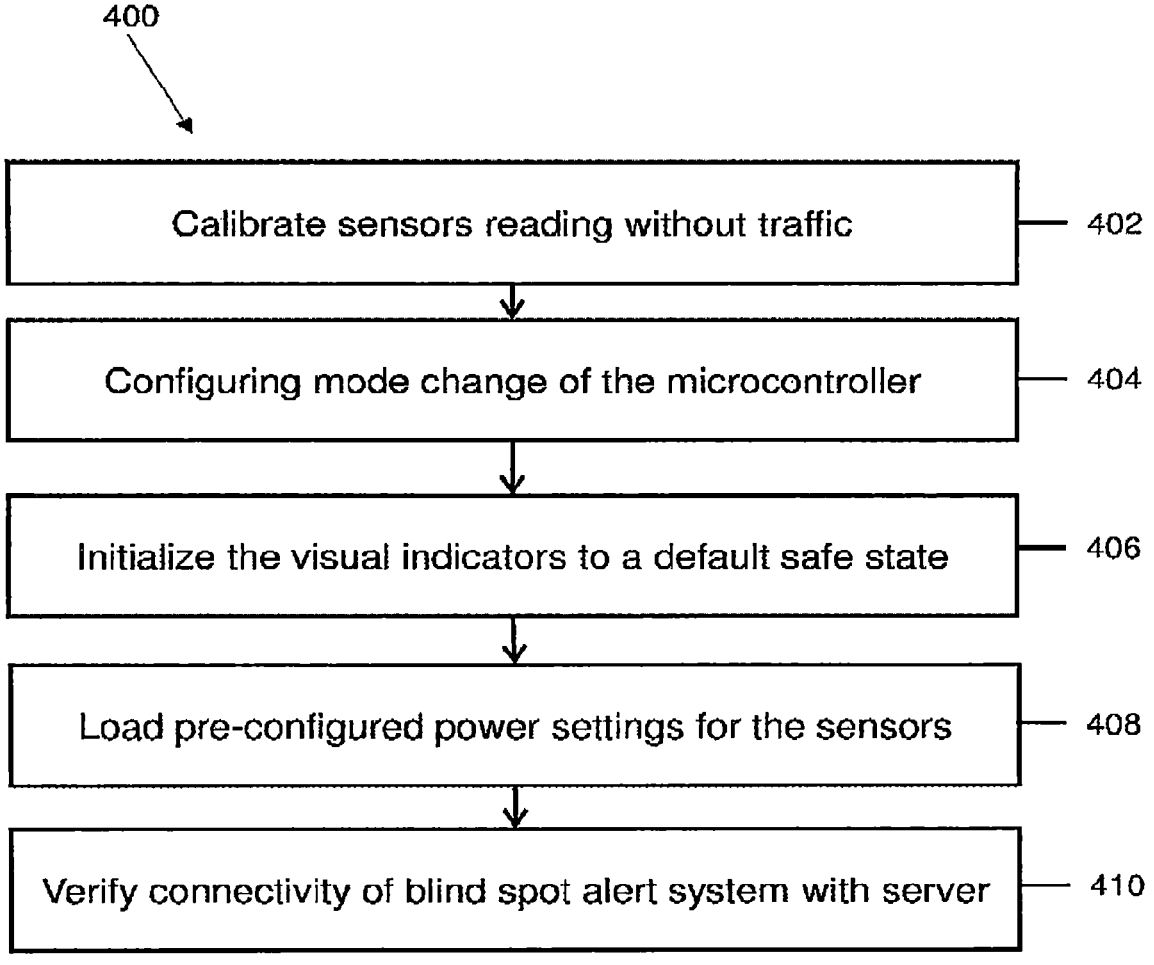
FIG. 4 illustrates a flow diagram of a method for initiating a sensor sub-system of the housing, according to an embodiment of the present invention.

FIG. 4 illustrates a flow diagram 400 of a method for initiating the sensor sub-system of the housing 102, according to an embodiment of the present invention. At step 402, the method includes calibrating the sensors reading without traffic (i.e., establishing a baseline for sensor readings in the absence of any vehicles or other moving objects). The blind spot alert system 100 is configured to calibrate the sensors reading without traffic. This step helps in distinguishing between actual traffic and background noise. Sensors like PIR, LIDAR, Ultrasonic, and Doppler are calibrated to ensure accuracy in detecting and measuring objects.

At step 404, the method includes configuring a mode change of the microcontroller 302. In an embodiment, Unified Channel (UC) mode is changed to an Interrupt Request (IRQ) mode. The blind spot alert system 100 is configured to change the mode of the microcontroller 302 from UC to IRQ. In reference to the above context, the UC mode refers to a specific operational mode in the eMIOS module for the NXP S32K344 microcontroller. In reference to the above context, the IRQ is a mechanism where a hardware device can signal the CPU that it requires attention, causing the CPU to temporarily suspend its current operations and execute a specific set of instructions known as an interrupt service routine (ISR). Setting UC channels to IRQ mode means configuring the eMIOS channels on the S32K344 microcontroller to generate interrupts when certain conditions are met, such as when a particular event occurs in the Unified Channel (UC) mode. This setup ensures that the microcontroller 302 can respond to the interrupts promptly, enabling efficient handling of time-sensitive tasks or events. In this context, it appears like the controller 302 is being configured to the mode where it can handle interrupts triggered by General Purpose Input/Output (GPIO) pins (possibly from buttons or other sensors connected to these pins), PIR sensors (detecting motion), and Radars (possibly for short-range detection). When any of these devices trigger an interrupt, the microcontroller 302 pauses its current task and executes an Interrupt Service Routine (ISR) to handle the event accordingly.

At step 406, the method includes initializing the visual indicators to a default safe state, for example, green lights. The blind spot alert system 100 is configured to initialize the visual indicators to the default safe state which means both turn signals, which are part of the indicator sub-system, are set to green. This indicates that the system is operational and there are no detected hazards.

At step 408, the method includes loading pre-configured power settings for the optical and sensor components from memory of the microcontroller 302, for example, Non-volatile random-access memory (NVRAM). These settings might include power levels, sensitivity adjustments, and operational modes optimized for different conditions. This step ensures that the sensors operate efficiently and according to the stored configurations. The blind spot alert system 100 is configured to load the pre-configured power settings for the optical and sensor components from memory of the NVRAM.

At step 408, the method includes verifying connectivity of the blind spot alert system 100 with the server. In an embodiment, the server is a remote server. In an embodiment, the server includes a diagnostic sub-system to manage sensor sub-system malfunctions. The microcontroller 302 sends a test signal or "ping" to the diagnostic server. The server responds, confirming that the communication link is active, and the system is online. This step helps in early detection of connectivity issues or hardware malfunctions, ensuring reliable operations. In an embodiment, the server is configured to send real-time alerts to a connected network or monitoring system for further action.

The various actions, acts, blocks, steps, or the like in the flow diagram may be performed in the order presented, in a different order, or simultaneously. Further, in some embodiments, some of the actions, acts, blocks, steps, or the like may be omitted, added, modified, skipped, or the like without departing from the scope of the invention.

Figure 5:
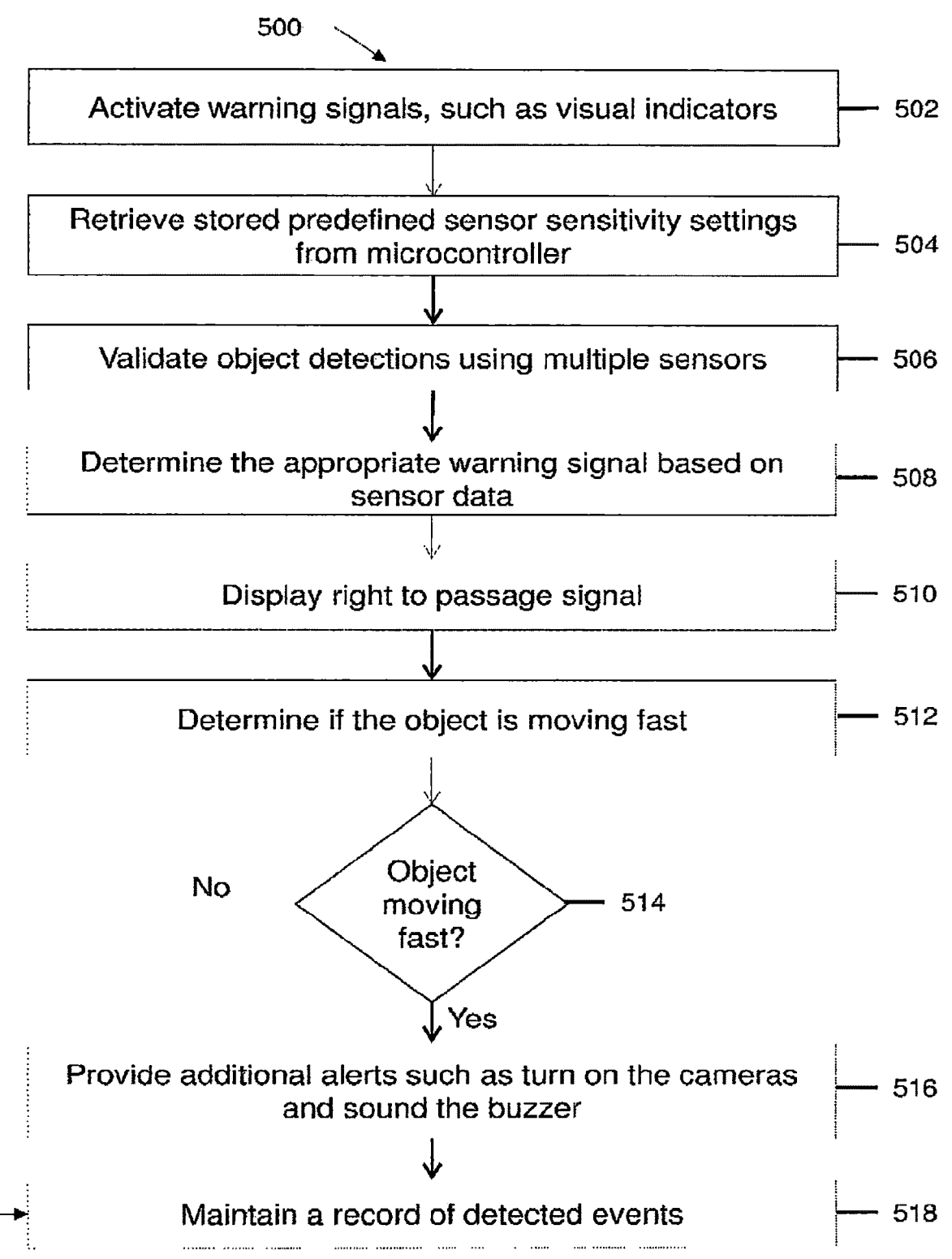
FIG. 5 illustrates a flow diagram of a method for detecting a sensor event sequence, according to an embodiment of the present invention.

FIG. 5 illustrates a flow diagram of a method for detecting a sensor event sequence, according to an embodiment of the present invention. At step 502, the method includes activating warning signal. For example, If the blind spot alert system 100 detects a vehicle approaching from the blind spot, it turns on warning lights to alert the other vehicle. The blind spot alert system 100 is configured to activate warning signal for the vehicle 108, if the vehicle 106 approaching from the blind spot. At step 504, the method includes retrieving stored predefined sensor sensitivity settings from the microcontroller 302. The microcontroller 302 is configured to retrieve the sensor sensitivity settings from its memory, for example, Non-volatile random-access memory (NVRAM), and applies these settings to at least one sensor event handler. In an example, the sensitivity settings might include thresholds for detecting different objects or conditions (e.g., adjusting for environmental factors like lighting or humidity).

At step 506, the method includes validating object detections using multiple sensors. The microcontroller 302 is configured to compare readings from various sensors (e.g., PIR sensor, LIDAR sensor, Ultrasonic sensor, Doppler sensor) to confirm the presence and characteristics of the detected object. For example, If the LIDAR sensor detects an object, the blind spot alert system 100 will check Ultrasonic and Doppler sensors to confirm its presence and motion characteristics. At step 508, the method includes determining the appropriate warning signal based on both the sensor data analysis and traffic rules of the location. The microcontroller 302 is configured to determine the appropriate warning signal based on both the sensor data analysis and traffic rules of the location. In an embodiment, the microcontroller 302 determines the right to passage signal based on the sensor data and traffic rules of the location, for example, United Kingdom (UK).

At step 510, the method includes displaying right to passage signal based on the appropriate warning signal determination. The indicator sub-system is configured to display right to passage signal based on the appropriate warning signal determination. In an example, right to passage signal refers to giving priority to one vehicle travelling from one direction over other vehicles travelling from the other direction according to traffic rules of UK. At step 512, the method includes determining if the object (i.e., vehicle 108) is moving fast. The microcontroller 302 is configured to determine if the object is moving fast.

If it is determined in step 514 that the object is moving fast, then at step 516, the method includes proving additional alerts such as turning on the cameras and sound the buzzer. The camera 324 is configured to record the event and the indicator sub-system is configured to sounds an audible buzzer to alert nearby vehicles of the approaching fast-moving vehicle. In reference to the above example, if vehicle 108 is moving fast, then the camera 324 is configured to record the event and the indicator sub-system is configured to sound an audible buzzer to the vehicle 106. If it is determined in step 514 that the object is not moving fast, then the method move to step 518.

After providing additional alerts, at step 518, the method includes maintaining a record of detected events. The microcontroller 302 is configured to maintain the record of detected events. The microcontroller 302 stores detailed information about the detected event, including sensor readings, timestamps, and actions taken. For example, the controller 302 logs data about the detected speeding vehicle 108, including speed, direction, time of day, and the system's response (e.g., activation of warnings and cameras). We may explain this by considering one scenario where vehicle 106 approaches the intersection from the left, and another vehicle 108 approaches from the right. Sensors detect both vehicles approaching at moderate speeds. The blind spot alert system 100 cross-references data from multiple sensors to confirm the presence of both vehicles. The blind spot alert system 100 calculates that vehicle 106 has the right of way and displays a stop sign for vehicle 108. Suddenly, Vehicle 108 accelerates towards the intersection. The blind spot alert system 100 turns on cameras to record the event, sounds the buzzer to warn nearby pedestrians and the vehicle 106, and logs all relevant data.

The various actions, acts, blocks, steps, or the like in the flow diagram may be performed in the order presented, in a different order, or simultaneously. Further, in some embodiments, some of the actions, acts, blocks, steps, or the like may be omitted, added, modified, skipped, or the like without departing from the scope of the invention.

FIG. 6 illustrates a flow diagram 600 of the method for providing blind spot warning to vehicles at the premise, according to an embodiment of the present invention. At step 602, the method includes mounting the housing 102 at the premise. The housing 102 is configured to signal vehicles 106 and 108 approaching from the first side and the second side, The housing 102 includes the sensor sub-system and the microcontroller. At step 604, the method includes detecting thermal radiation of nearby animate entities using at least one Passive Infrared (PIR) sensor within the sensor sub-system. The PIR sensors are configured to detect thermal radiation of nearby animate entities. At step 606, the method includes determining vectored distances of surrounding objects using at least one Light Detection and Ranging (LIDAR) sensor within the sensor sub-system. The LIDAR sensors are configured to determine vectored distances of surrounding objects.

At step 608, the method includes determining non-vectored distances of surrounding objects using at least one Ultrasonic sensor within the sensor sub-system. The Ultrasonic sensors are configured to determine non-vectored distances of the surrounding objects. At step 610, the method includes capturing velocity and trajectory of the vehicles using at least one Doppler speed measurement sensor within the sensor sub-system. The Doppler sensors are configured to capture velocity and trajectory of the vehicles. At step 612, the method includes receiving the sensor data from the sensor sub-system. The microcontroller 302 is configured to receive the sensor data from the sensor sub-system.

At step 614, the method includes analysing the received data from the sensor sub-system. The microcontroller 302 is configured to analyse the received data from the sensor sub-system. At step 616, the method includes producing the warning signal based on the analysis of the sensor data. The microcontroller 302 is produce the warning signal based on the analysis of the sensor data. At step 618, the method includes sending the warning signal from the microcontroller 302 to the indicator sub-system. The microcontroller 302 is configured to send the warning signal from the microcontroller 302 to the indicator sub-system.

At step 620, the method includes providing warning indications to the vehicles approaching from the first side and the second side using the indicator sub-system. The indicator sub-system is configured to providing warning indications to the vehicles approaching from the first side and the second side. At step 622, the method includes transmitting the analysed data from the housing to the server. The blind spot alert system 100 is configured to transmit the analysed data from the housing to the server.

The various actions, acts, blocks, steps, or the like in the flow diagram may be performed in the order presented, in a different order, or simultaneously. Further, in some embodiments, some of the actions, acts, blocks, steps, or the like may be omitted, added, modified, skipped, or the like without departing from the scope of the invention.

The described blind spot alert system offers several advantages that enhance safety and reliability at premises such as intersections, driveways, and parking areas. The combination of PIR, LIDAR, Ultrasonic, and Doppler sensors provide a robust detection mechanism that can identify a wide range of potential hazards, including vehicles, pedestrians, and animals. The system processes data from multiple sensors to generate accurate warning signals, reducing the likelihood of false alarms and ensuring timely alerts to drivers. Continuous monitoring of the environment ensures that any potential hazard is detected and communicated instantly, helping to prevent accidents. The use of a hybrid power management system, including solar cells, batteries, and a DC power supply, ensures that the system remains operational under various conditions, including power outages. The system can adjust its sensitivity and operational parameters based on environmental conditions such as lighting, humidity, and traffic density, maintaining its effectiveness in different scenarios.

The housing design includes mounting brackets or fixtures that make it easy to install at various locations on a premise. The ability to ping a diagnostic server allows for remote monitoring and troubleshooting, simplifying maintenance and ensuring the system remains in good working order. The microcontroller's ability to filter out noise and irrelevant data ensures that only pertinent information is used to generate warnings, enhancing the precision and reliability of the alerts. Users can adjust sensitivity and other parameters according to specific needs, allowing for customization based on the unique requirements of different locations. The system provides clear and visible warnings to drivers through turn signals or other visual indicators, improving communication and awareness. Analysed data can be sent to a server for further processing or integration with other traffic management systems, enabling a coordinated approach to traffic safety.

The inclusion of solar cells not only reduces the reliance on external power sources but also makes the system more sustainable and environmentally friendly. The PMIC ensures efficient power distribution and usage, extending the lifespan of the battery and reducing overall energy consumption. The initial calibration step without traffic ensures that the system is set up correctly with minimal user intervention. The use of green signals to indicate system readiness provides a clear and straightforward method for users to understand the system's status. The blind spot alert system described offers significant advantages in terms of safety, reliability, ease of installation, and energy efficiency. Its advanced sensor integration and data processing capabilities ensure accurate and timely alerts, while the hybrid power management system and remote diagnostic capabilities provide robust and reliable operation under various conditions. These features collectively enhance traffic safety at critical locations, helping to prevent accidents and improve overall situational awareness for drivers.

Although particular embodiments of the invention have been described in detail for purposes of illustration, various modifications, and enhancements may be made without departing from the spirit and scope of the invention.

What is claimed is:

1. A blind spot alert system, comprising:
a housing mounted at a premise, the housing being configured at a location to signal vehicles coming from a first side and a second side, the housing comprising:
a sensor sub-system, comprising:
at least one Passive Infrared (PIR) sensor configured to detect thermal radiation of nearby animate entities;
at least one Light Detection and Ranging (LIDAR) sensor configured to determine vectored distance of surrounding objects;
at least one Ultrasonic sensor configured to determine non-vectored distance of the surrounding objects;
at least one Doppler speed measurement sensor configured to capture velocity and trajectory of the vehicles, wherein the Doppler speed measurement sensor is configured to distinguish between vehicles and other moving objects based on velocity profiles;
a microcontroller configured to process data received from the sensor sub-system, wherein processing data comprising:
receiving sensor data from the sensor sub-system;
analyzing the received data from the sensor sub-system;
producing a warning signal based on the analysis; and
sending the warning signal to an indicator sub-system, wherein the indicator sub-system provides warning indication to the vehicles coming from the first side and the second side; and
a server configured to receive analyzed data from the housing.

2. The blind spot alert system of claim 1, wherein the housing further comprises a hybrid power management sub-system.

3. The blind spot alert system of claim 2, wherein the hybrid power management sub-system comprises at least two of a Direct Current (DC) power supply, a Lithium-ion battery power supply, a Solar power supply.

4. The blind spot alert system of claim 1, wherein the housing further comprises at least one camera configured to detect at least one object in the blind spot of the vehicles.

5. The blind spot alert system of claim 4, wherein the at least one camera is further configured to capture an image of the at least one object in the blind spot.

6. The blind spot alert system of claim 1, wherein the sensor data is collected based on one or more parameters.

7. The blind spot alert system of claim 6, wherein one or more parameters comprises at least one of arrangement of the housing at the location, lighting condition of surrounding environment of the housing, humidity condition of the location, and sensitivity set for the location.

8. The blind spot alert system of claim 1, wherein the Ultrasonic sensor is calibrated to detect objects within a predetermined range to minimize false alarms.

9. The blind spot alert system of claim 1, further comprising an Artificial Intelligence sub-system within the microcontroller to improve the accuracy of warning signals over time based on historical data.

10. The blind spot alert system of claim 1, wherein the microcontroller is further configured to filter out noise and irrelevant data from the sensor sub-system to enhance the precision of the warning signals.

11. The blind spot alert system of claim 1, wherein the warning indication provided by the indicator sub-system includes visual signals.

12. The blind spot alert system of claim 1. wherein the warning indication provided by the indicator sub-system includes auditory signals.

13. The blind spot alert system of claim 1, wherein the server is configured to send real-time alerts to a connected network or monitoring system for further action.

14. The blind spot alert system of claim 1, wherein the housing is weatherproof and designed to operate under various environmental conditions.

15. The blind spot alert system of claim 1, wherein the server comprises a diagnostic sub-system to manage sensor sub-system malfunctions.

16. The blind spot alert system of claim 1, wherein the microcontroller includes a communication module to interface with external devices or networks wirelessly.

17. The blind spot alert system of claim 1, wherein the microcontroller is configured to prioritize warning signals based on predefined rules.

18. A method for providing blind spot warning to vehicles at a premise, comprising:

mounting a housing at the premise, the housing configured to signal vehicles approaching from a first side and a second side, the housing comprising a sensor sub-system and a microcontroller;

detecting thermal radiation of nearby animate entities using at least one Passive Infrared (PIR) sensor within the sensor sub-system;

determining vectored distances of surrounding objects using at least one Light Detection and Ranging (LIDAR) sensor within the sensor sub-system;

determining non-vectored distances of surrounding objects using at least one Ultrasonic sensor within the sensor sub-system;

capturing velocity and trajectory of the vehicles using at least one Doppler speed measurement sensor within the sensor sub-system;

processing sensor data at the microcontroller, the processing comprising:

receiving the sensor data from the sensor sub-system;

analysing the received data from the sensor sub-system;

producing a warning signal based on the analysis of the sensor data;

sending the warning signal from the microcontroller to an indicator sub-system;

providing warning indications to the vehicles approaching from the first side and the second side using the indicator sub-system;

transmitting the analysed data from the housing to a server; and wherein the sensor data is collected based on one or more parameters comprising at least one of arrangement of the housing at a location, lighting condition of surrounding environment of the housing, humidity condition of the location, and sensitivity set for the location.

19. A blind spot alert system, comprising:

a housing mounted at a premise, the housing being configured at a location to signal vehicles coming from a first side and a second side, the housing comprising:

a sensor sub-system, comprising:

at least one Passive Infrared (PIR) sensor configured to detect thermal radiation of nearby animate entities;

at least one Light Detection and Ranging (LIDAR) sensor configured to determine vectored distance of surrounding objects;

at least one Ultrasonic sensor configured to determine non-vectored distance of the surrounding objects;

at least one Doppler speed measurement sensor configured to capture velocity and trajectory of the vehicles;

at least one camera configured to detect at least one object in the blind spot of the vehicles;

a microcontroller configured to process data received from the sensor sub-system, wherein processing data comprising:

receiving sensor data and object detection data from the sensor sub-system;

analyzing the received data from the sensor sub-system;

producing a warning signal based on the analysis; and sending the warning signal to an indicator sub-system, wherein the indicator sub-system provides warning indication to the vehicles coming from the first side and the second side; and a server configured to receive analyzed data from the housing, wherein the server comprises a diagnostic sub-system to manage the sensor sub-system malfunctions.

* * * * *